United States Patent
Helot et al.

(10) Patent No.: US 6,833,989 B2
(45) Date of Patent: *Dec. 21, 2004

(54) CONNECTOR SYSTEM FOR A DOCKING STATION OF A PORTABLE COMPUTER SYSTEM

(75) Inventors: Jacques H Helot, Rotterdam (NL); Michael D Derocher, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 10/654,323

(22) Filed: Sep. 3, 2003

(65) Prior Publication Data

US 2004/0043657 A1 Mar. 4, 2004

Related U.S. Application Data

(63) Continuation of application No. 09/547,361, filed on Apr. 11, 2000, now Pat. No. 6,628,517.

(51) Int. Cl.$^7$ ................................................. G06F 1/16
(52) U.S. Cl. ....................... 361/686; 361/724; 710/303; 439/638
(58) Field of Search ................................ 361/683–686, 361/724–727; 439/638–639; 710/69, 303, 304; 713/322

(56) References Cited

U.S. PATENT DOCUMENTS 6,628,517 B1 * 9/2003 Helot et al. .................. 361/686
2003/0193776 A1 * 10/2003 Bicknell et al. ............. 361/685

* cited by examiner

Primary Examiner—Hung Van Duong

(57) ABSTRACT

The present invention is embodied in a connector system for a docking station of a portable computer. The connector system includes a peripheral connector array that is removeably coupled, both mechanically and electrically, to a docking station or port replicator. Since the connector array is removeably coupled to the port replicator, the connector array can be maneuvered to allow easy and convenient connection of appropriate peripherals to the connector array. Also, the port replicator preferably has a recessed area for storing the connector array after electrical connection of appropriate peripherals to the connector array. This reduces clutter and tangling of the cables connected to the peripherals. In addition, the connector array can be of various sizes and shapes and can be designed to interface with specific portable computers. Further, the connector system of the present invention can be upgradeable in that the port replicator can accept upgraded or newer connector arrays that have additional or advanced connections for peripheral devices.

22 Claims, 3 Drawing Sheets

CONNECTOR SYSTEM FOR A DOCKING STATION OF A PORTABLE COMPUTER SYSTEM

This application is continuation of U.S. patent application Ser. No. 09/547,361 filed Apr. 11, 2000, now U.S. Pat. No. 6,628,517.

BACKGROUND OF THE INVENTION

1. Technical Field

The present invention relates in general to portable computers and connectors, and more particularly to a connector system for a docking station of a portable computer.

2. Related Art

Portable computers are popular and widespread devices that provide a user with mobile computing power in a small, lightweight portable package. Portable computers include notebook computers, laptop computers and hand-held computing devices (such as personal digital assistants (PDAs)). In order to save size and weight, portable computers frequently have less functionality that a desktop computer and have smaller devices (such as keyboards and monitors). For example, a portable computer may lack certain drive modules (such as a CD-ROM drive or a floppy drive) and may have a smaller monitor and keyboard.

Although portable computers are very efficient mobile computing devices, they also can be used in non-mobile computing environments. For example, one common device that enables a user to use a portable computer as a "replacement" for a desktop computer is a docking platform. A docking platform (such as a docking station or a port replicator) facilitates the use of a portable computer with components that are usually considered non-portable and associated with the desktop computer system, such as desktop computer peripherals and network connections.

Docking platforms are typically used to interface portable computers to other portable, desktop or non-portable electronic peripherals, such as computer monitors, optical disk drives, full-size keyboards, pointing devices such as trackballs or mice, digital cameras, and other devices. Many types and styles of docking stations have been developed to interface with portable computers. Several of the more common types of docking stations are described below.

One example of a simple type of docking station is commonly known as a "port replicator." Port replicators generally attach to a single connector on the portable computer. The port replicator duplicates the connectors typically found on the portable computer and may add additional functionality to the system. These connectors often include PS2 keyboard and mouse connectors, serial connectors, parallel connectors, Universal Serial Bus (USB) connectors, audio input and output connectors, and video connectors. In general, a port replicator is useful for quickly connecting a portable computer to one or more peripherals that may be permanently or temporarily connected to the port replicator. The portable computer is simply connected to the port replicator via a single connector, instead connecting each individual peripheral to the portable computer. The port replicator provides access to each of the peripherals connected to the port replicator.

However, while port replicators are good for making a quick connection to multiple peripherals, and are relatively inexpensive, they have several problems that limit their utility. For example, port replicators are limited to the connectors built into them, such as those described above, and thus have no expansion capability. If a computer user desires to add a peripheral such as an Ethernet connection to a computer network, or a faster graphics processor, the user would be unable to add such capability through the port replicator. Further, port replicators typically connect directly to the back of a portable computer, while multiple peripherals are connected via interface cables directly to the back of the port replicator. Consequently, the surface upon which the computer is resting often appears cluttered and unsightly due to a tangle of interface cables connected to the port replicator. Further, since each peripheral needs to be individually connected to the port replicator, access to the port replicator is cumbersome and inconvenient. Therefore, what is needed is a system for allowing easy and convenient connection of a port replicator or docking station to non-portable peripherals for a portable computer.

SUMMARY OF THE INVENTION

To overcome the limitations in the prior art as described above, and to overcome other limitations that will become apparent upon reading and understanding the present specification, the present invention is embodied in a connector system for a docking station of a portable computer.

The connector system includes a peripheral connector array that is removeably coupled, both mechanically and electrically, to a docking station or port replicator. The connector system can include an independent power supply or can be powered by a power supply contained in the port replicator. Since the connector array is removeably coupled to the port replicator, the connector array can be maneuvered to allow easy and convenient connection of appropriate peripherals to the connector array.

Also, the port replicator can have a recessed area for storing the connector array after electrical connection of appropriate peripherals to the connector array. Storage of the connector array reduces clutter and tangling of the cables connected to the peripherals. However, for slim or smaller form factor portable computers, the port replicator can be smaller, and thus, the connector array can simply be electrically coupled to the port replicator. As such in this embodiment, the connector array does not need to be mechanically fitted within the port replicator. In addition, the connector array can be of various sizes and shapes and can be designed to interface with specific portable computers. Further, the connector system of the present invention can be upgradeable in that the docking station or port replicator can accept upgraded or newer connector arrays.

Moreover, the connector array can be an enhanced port replicator with the addition of one or more enhancements such as, for example, Ethernet connectivity, one or more PCMCIA expansion slots, or an ISA or PCI computer card slot. Peripheral devices connected to the enhanced port replicator may be controlled either by electronics within the portable computer, or by one or more computer cards installed within the expansion slots.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

The present invention can be further understood by reference to the following description and attached drawings that illustrate the preferred embodiment. Other features and advantages will be apparent from the following detailed description of the preferred embodiment, taken in conjunction with the accompanying drawings, which illustrate, by way of example, the principles of the present invention.

Referring now to the drawings in which like reference numbers represent corresponding parts throughout.

DETAILED DESCRIPTION OF THE PREFERRED EMBODIMENTS

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

System and Operational Overview

Figure 1:
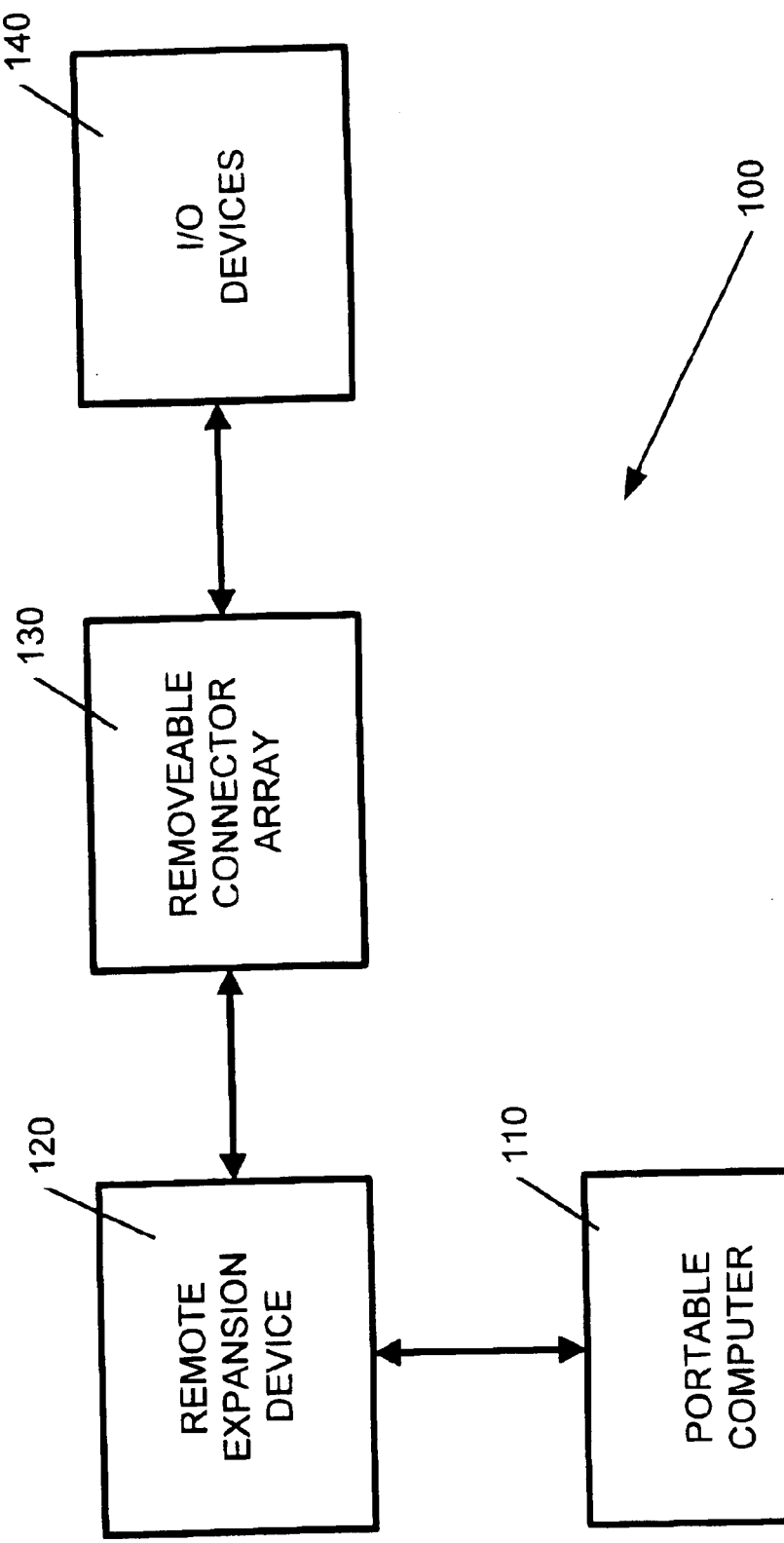
FIG. 1 is an overall block diagram of a docking system in accordance with the present invention.

FIG. 1 is an overall block diagram of a docking system in accordance with the present invention. In general, FIG. 1 is a functional block diagram illustrating a system 100 for interfacing a portable computer 110 to a remote expansion device 120, such as a docking station or port replicator 120. The docking station or port replicator includes a connector array 130 for interfacing input/output devices such as peripheral devices 140 to the portable computer 110.

Specifically, a portable computer 110 is removeably attached to the remote expansion device 120 (docking station or port replicator). The connection between the portable computer 110 and the remote expansion device 120 preferably provides both a physical and electrical connection that both secures the portable computer 110 to the remote expansion device 120, and provides an electrical communications interface between the portable computer 110 and the remote expansion device, such as for connecting the portable computer to external peripherals or for adding functionality including adding disk drives or a power source.

The connector array 130 is preferably removeably coupled, both mechanically and electrically, to the remote expansion device 120. However, it should be noted, for slim or smaller form factor portable computers, the remote expansion device 120 can be smaller, and thus, the connector array 130 can simply be electrically coupled to the remote expansion device 120, and not mechanically coupled, to allow the remote expansion device 120 to be as small as possible. As such, in this embodiment, the connector array 130 does not need to be mechanically fitted within the remote expansion device 120.

Since the connector array 130 is removeably coupled to the remote expansion device 120, the connector array 130 can be maneuvered to allow easy and convenient connection of appropriate peripherals 140 to the connector array 130. The remote expansion device 120 can be configured to support peripheral devices 140 on the connector array 130, such as, for example, printers, mice, trackballs, keyboards, digital cameras, scanners, microphones, speakers, video display devices and the like. The connector array 130 can have any combination, or type, of ports, such as for example, PS2, USB, serial, parallel, IEEE 1394, audio input or output, video input or output connectors, etc. These ports provide an electrical communications interface between attached peripheral devices 140 and the portable computer 110.

Component Details and Operation

Figure 2:
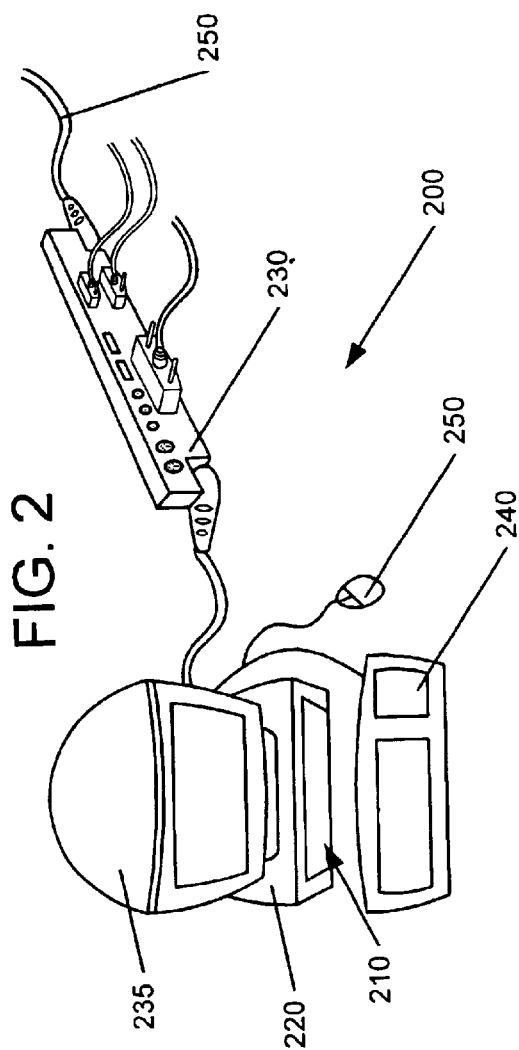
FIG. 2 is a working example, shown for illustrative purposes only, of the computer docking system of FIG. 1.

FIG. 2 is a working example, shown for illustrative purposes only, of the computer docking system of FIG. 1. The present invention allows a portable computer 210 (similar to the portable computer 110 of FIG. 1) to be easily and conveniently used in a non-mobile computing environment 200. In this example, the portable computer 210 is used as a "replacement" for a desktop computer. A remote expansion device 220 (similar to the remote expansion device 120 of FIG. 1), such as a docking station or a port replicator, allows use of the portable computer 210 with input/output devices that are usually considered non-portable and associated with a desktop computer system via a connector array 230 (similar to the connector array 130 of FIG. 1). The non-portable devices can include a display monitor 235, a keyboard 240, a mouse 250, a printer (not shown) and other devices that typically interface to remote expansion devices.

The portable computer 210 is electrically coupled, and preferably mechanically coupled, to the port replicator 220 in a removable fashion. For instance, the portable computer 210 can attach to the remote expansion device 220 via a single connector (not shown). The remote expansion device 220 can be any suitable expansion device, such as a docking station or a port replicator. Also, the connector array 230 allows quick connection of the portable computer 210 to one or more input/output devices 235, 240, 250 (similar to the input/output devices 140 of FIG. 1) that may be permanently or temporarily connected to the remote expansion device 220.

Typically, the remote expansion device 220 is connected to the input/output devices via the connector array 230. The input/output devices remain connected to the remote expansion device 220 during mobile use of the portable computer 210 outside of the computing environment 200. During non-mobile use of the portable computer 210, to facilitate an interface between the portable computer 210 and the input/output devices, the portable computer 210 is simply connected to the remote expansion device 220. This allows easy and convenient interfacing between all of the input/output devices and the portable computer 210 via a single connection between the portable computer 210 and the remote expansion device 220. Thus, multiple connections and disconnections are avoided to allow quick access to each of the input/output devices connected to the remote expansion device 220.

The connector array 230 is preferably removeably coupled, both mechanically and electrically, to the remote expansion device 220. However, as discussed above and shown in FIG. 3, for smaller form factor portable computers, the remote expansion device 220 is preferably only electrically coupled to connector array 230, and not mechanically coupled, to allow the port replicator 220 to be as small as possible. In both cases, since the connector array 230 is removeably coupled to the remote expansion device 220, the connector array 230 can be conveniently and easily maneuvered during connection of peripherals.

For example, in prior docking station systems, typically, multiple peripherals are connected via interface cables directly to the back of the remote expansion device. Consequently, the surface upon which the computer is resting often appears cluttered and unsightly due to a tangle of interface cables connected to the port replicator. Further, since each peripheral needs to be individually connected to the remote expansion device via cables, access to the remote expansion device 220 is cumbersome and inconvenient.

Figure 3:
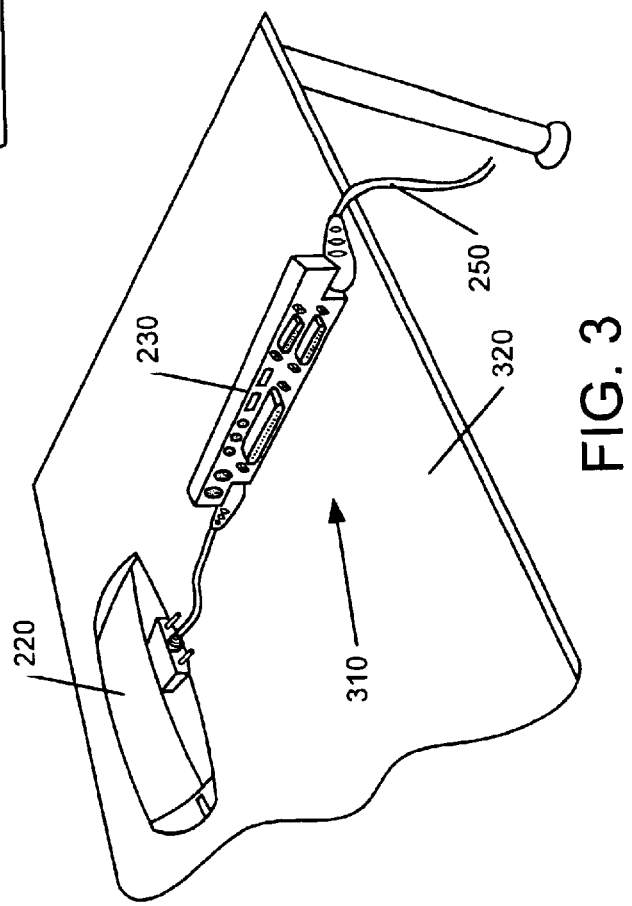
FIG. 3 is a working example, shown for illustrative purposes only, of an alternative embodiment of the computer docking system of FIG. 2.

In contrast, as shown in FIG. 3, to solve this problem, the connector array 230 of the present invention is removeably coupled to the remote expansion device 220. This configuration allows the connector array 230 to be maneuvered and placed in an area 310, such as an open area of a table 320, as shown in FIG. 3, for easy and convenient connection of cables 250 to appropriate input/output devices via the connector array 230.

Figure 4:
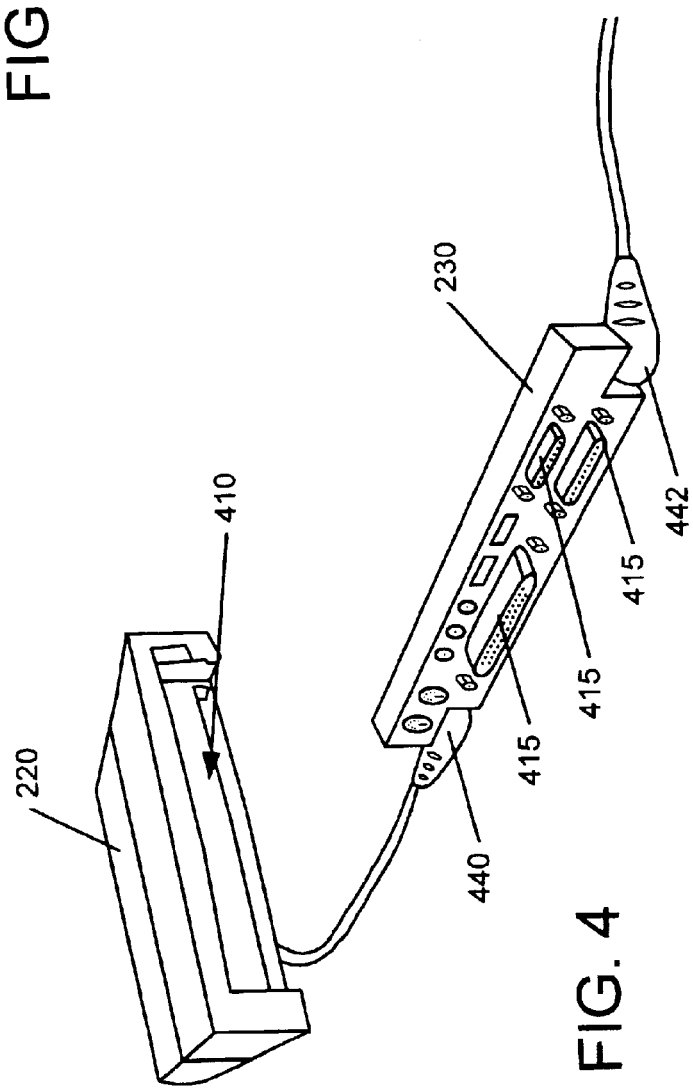
FIG. 4 is a working example of the connector array, shown for illustrative purposes only, of the computer docking system of FIG. 2 mechanically disconnected from the port replicator.

FIG. 4 is a working example of the connector array 230, shown for illustrative purposes only, of the computer docking system of FIG. 2 mechanically disconnected from the remote expansion device 220. Referring to FIG. 4 along with FIG. 2, the remote expansion device 220 preferably has a recessed area 410 for storing the connector array 230 after appropriate peripherals are electrically connected to ports 415 of the connector array 230. This reduces clutter and tangling of the cables 250 connecting the ports 415 of the connector array 230 to the input/output devices (not shown).

In addition, an electrical cable 430 having a first rotating strain relief joint 440, can be used to couple the connector array 230 to the remote expansion device 220. The strain relief joint 440 can be removeably connected to the connector array 230 and the cable 430 can be removeably connected to the remote expansion device 220. A second joint 442 can be used to supply the connector array 230 with power. In this case, the connector array 230 includes an independent power. Alternatively, the connector array 230 can be powered by a power supply contained in the remote expansion device 220.

Although FIGS. 2–4 depict the connector array 230 as a rectangular block that fits within the recessed area 410 of the remote expansion device 220, the connector array 230 can be any suitable size and shape and can be designed to interface with specific portable computers. Further, the remote expansion device 220 can be upgradeable so that it accepts any suitable connector array 230, such as upgraded or newer connector arrays, as well as connector arrays that are enhanced and have additional or advanced connections for input/output devices, such as network communication capabilities.

Figure 5:
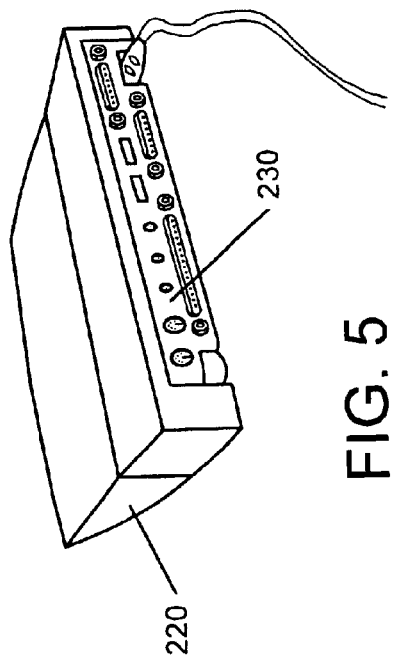
FIG. 5 is a working example of the connector array, shown for illustrative purposes only, of the computer docking system of FIG. 2 mechanically connected to the port replicator.

FIG. 5 is a working example of the connector array, shown for illustrative purposes only, of the computer docking system of FIG. 2 mechanically connected to the port replicator. Referring to FIG. 5 along with FIGS. 2–4, the connector array is shown fitted within the recessed area 410 of the remote expansion device 220. Depending on the desired configuration, the connector array can be stored within the recessed area 410 or maneuvered to allow easy and convenient location and connection of appropriate input/output devices to the connector array 230 or for reducing clutter and tangling of the cables of the input/output devices connected to the connector array 230.

The foregoing description of the preferred embodiments of the invention has been presented for the purposes of illustration and description. It is not intended to be exhaustive or to limit the invention to the precise form disclosed. Accordingly, the foregoing description should be regarded as illustrative rather than restrictive, and it should be appreciated that variations may be made in the embodiments described by workers skilled in the art without departing from the scope of the present invention as defined by the following claims.

What is claimed is:

1. An input/output device interface for a portable computer, comprising:
    a remote expansion device removeably coupled to the portable computer;
    a removable connector array electrically coupled to the remote expansion device and including at least one peripheral component interconnect (PCI) interlace port for coupling input/output devices to the portable computer via the remote expansion device; and
    a storage area located within the remote expansion device for mechanically storing the connector array within the storage area in a removable fashion.

2. The input/output device interface of claim 1, wherein the connector array is electrically coupled to an external power source.

3. The input/output device interface of claim 1, wherein the connector array includes an internal power source.

4. The input/output device interface of claim 1, further comprising an upgradeable module associated with the remote expansion device for allowing upgraded connector arrays to connect to the remote expansion device.

5. The input/output device interface of claim 1, wherein the connector array is a port replicator that includes a personal computer memory card association (PCMCIA) slot for accepting associated PC cards.

6. The input/output device interface of claim 1, further comprising a strain relief joint at the electrical coupling between the connector array and the remote expansion device.

7. The input/output device interface of claim 1, wherein the removable connector array includes a personal computer memory card association (PCMCIA) slot that accepts PC cards that interface the portable computer with personal data assistant (PDA) devices.

8. The input/output device interface of claim 4, wherein the upgradeable module associated with the remote expansion device is a personal computer memory card association (PCMCIA) slot for accepting associated PC cards.

9. The input/output device interface of claim 5, wherein the port replicator includes a portable network communications device.

10. The input/output device interface of claim 7, wherein the PCMCIA slot accepts PC cards that interface the portable computer with desktop computers for sharing data between the desktop computer and portable computer.

11. The input/output device interface of claim 8, wherein the PCMCIA slot accepts at least one of memory devices, mass storage devices, networking devices, wireless communication devices and consumer electronic devices.

12. An interface device for a portable computer, comprising:
    means for removeably coupling a remote expansion device to the portable computer;
    means for electrically coupling a removable connector array to the remote expansion device;
    means for coupling input/output devices to the portable computer via at least one peripheral component interconnect (PCI) interface port of the remote expansion device; and
    means for mechanically storing the connector array within a storage area located within the remote expansion device in a removable fashion.

13. The interface device of claim 12, wherein the connector array is electrically coupled to an external power source.

14. The interface device of claim 12, further comprising an upgradeable module associated with the remote expansion device for allowing upgraded connector arrays to connect to the remote expansion device.

15. The interface device of claim 12, wherein the connector array is a port replicator that includes a personal computer memory card association (PCMCIA) slot for accepting associated PC cards.

16. The interface device of claim 12, further comprising a strain relief joint at the electrical coupling between the connector array and the remote expansion device.

17. The interface device of claim 12, wherein the removable connector array includes a personal computer memory card association (PCMCIA) slot that accepts PC cards that interface the portable computer with personal data assistant (PDA) devices.

18. The interface device of claim 13, wherein the connector array includes an internal power source.

19. The interface device of claim 14, wherein the upgradeable module associated with the remote expansion device is a personal computer memory card association (PCMCIA) slot for accepting associated PC cards.

20. The interface device of 15, wherein the port replicator includes a portable network communications device.

21. The interface device of claim 17, wherein the PCMCIA slot accepts PC cards that interface the portable computer with desktop computers for sharing data between the desktop computer and portable computer.

22. The interface device of claim 19, wherein the PCMCIA slot accepts at least one of memory devices, mass storage devices, networking devices, wireless communication devices and consumer electronic devices.

* * * * *